(12) United States Patent
D' Jesus Bencci

(10) Patent No.: US 10,048,832 B2
(45) Date of Patent: Aug. 14, 2018

(54) PERFORMING ACTIONS THROUGH A USER INTERFACE

(71) Applicant: SAMSUNG ELECTRONICS CO., LTD., Suwon-si (KR)

(72) Inventor: German Jose D' Jesus Bencci, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 469 days.

(21) Appl. No.: 14/425,224

(22) PCT Filed: Aug. 29, 2013

(86) PCT No.: PCT/KR2013/007789
§ 371 (c)(1),
(2) Date: Mar. 2, 2015

(87) PCT Pub. No.: WO2014/035168
PCT Pub. Date: Mar. 6, 2014

(65) Prior Publication Data
US 2015/0301696 A1 Oct. 22, 2015

(30) Foreign Application Priority Data

Aug. 29, 2012 (GB) .................................. 1215366.4

(51) Int. Cl.
*G06F 3/00* (2006.01)
*G06F 3/0482* (2013.01)
(Continued)

(52) U.S. Cl.
CPC .......... *G06F 3/0482* (2013.01); *G06F 3/0486* (2013.01); *G06F 3/04842* (2013.01);
(Continued)

(58) Field of Classification Search
CPC .. G06F 3/0482; G06F 3/04842; G06F 3/0486; G06F 3/04886; H04L 51/046; G09G 5/346

See application file for complete search history.

(56) References Cited

U.S. PATENT DOCUMENTS 5,920,303 A 7/1999 Baker et al.
2008/0030456 A1 2/2008 Asadi
(Continued)

FOREIGN PATENT DOCUMENTS

GB 2474053 A 4/2011
GB 2486707 A 6/2012
(Continued)

OTHER PUBLICATIONS

Communication dated Dec. 24, 2012 issued by the Intellectual Property Office of the United Kingdom in counterpart GB Application No. 1215366.4.
(Continued)

Primary Examiner — Jeffrey A Gaffin
Assistant Examiner — Ayesha Huertas Torres
(74) Attorney, Agent, or Firm — Sughrue Mion, PLLC

(57) ABSTRACT

The present invention relates to a user interface in a device, in which first and second selection areas are displayed on a display. The first selection area can be an area for selecting an object. In response to user input being received that selects the first selection area and the second selection area, a first predetermined action is performed for the selected object in response to the user input selecting the first selection area before the second selection area, and a second predetermined action is performed for the selected object in response to the user input selecting the second selection area before the first selection area. The user input can be received
(Continued)

by various methods, including a touch and/or drag event received through a touch screen.

20 Claims, 5 Drawing Sheets

(51) Int. Cl.
*G06F 3/0486* (2013.01)
*G06F 3/0488* (2013.01)
*G06F 3/0484* (2013.01)
*H04L 12/58* (2006.01)
*G09G 5/34* (2006.01)

(52) U.S. Cl.
CPC ........ *G06F 3/04886* (2013.01); *H04L 51/046* (2013.01); *G09G 5/346* (2013.01)

(56) References Cited

U.S. PATENT DOCUMENTS

| | | | |
|---|---|---|---|
| 2010/0093400 A1* | 4/2010 | Ju | G06F 3/04817 455/566 |
| 2011/0010271 A1 | 1/2011 | Black et al. | |
| 2011/0072373 A1* | 3/2011 | Yuki | G06F 3/04817 715/764 |
| 2011/0145768 A1 | 6/2011 | Leffert et al. | |
| 2011/0219312 A1 | 9/2011 | Kim et al. | |
| 2011/0279384 A1 | 11/2011 | Miller et al. | |
| 2011/0316797 A1* | 12/2011 | Johansson | G06F 3/04847 345/173 |
| 2012/0052915 A1* | 3/2012 | Sung | H04M 1/72519 455/564 |

FOREIGN PATENT DOCUMENTS

| | | |
|---|---|---|
| JP | 2009-544098 A | 12/2009 |
| KR | 10-2009-0053776 A | 5/2009 |
| KR | 10-2009-0107866 A | 10/2009 |
| KR | 10-2011-0029058 A | 3/2011 |
| WO | 2010040670 A2 | 4/2010 |
| WO | 2012/028773 A1 | 3/2012 |

OTHER PUBLICATIONS

Communication dated Mar. 18, 2016, issued by the European Patent Office in counterpart European Application No. 13832914.9.

Search Report dated Dec. 26, 2013 issued by the International Searching Authority in counterpart International Patent Application No. PCT/KR2013/007789 (PCT/ISA/210).

* cited by examiner

【Figure 1】
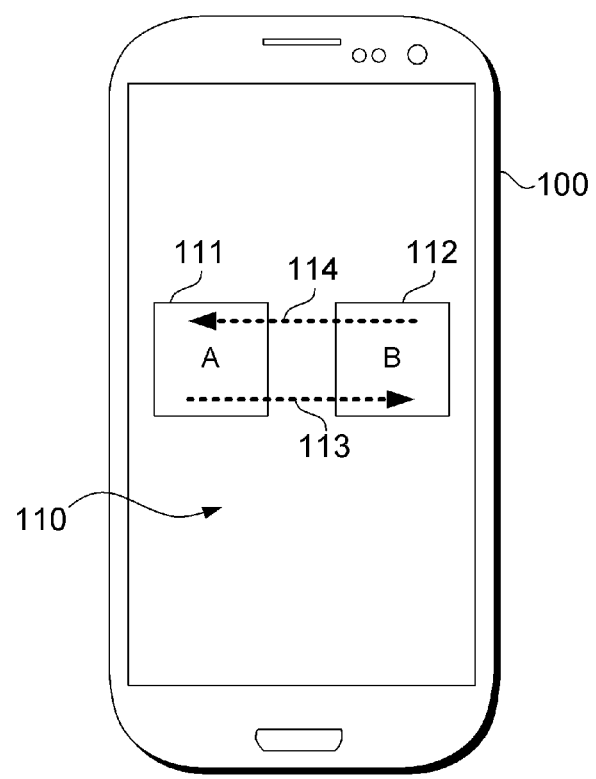

[Figure 2]
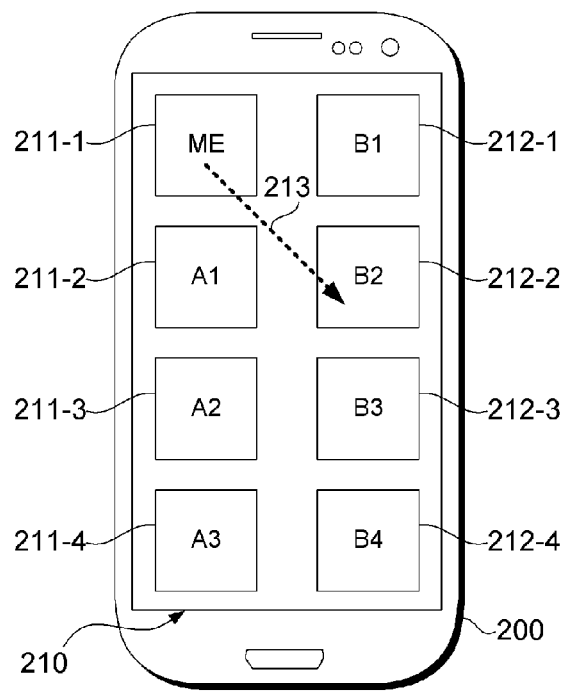
[Figure 3]
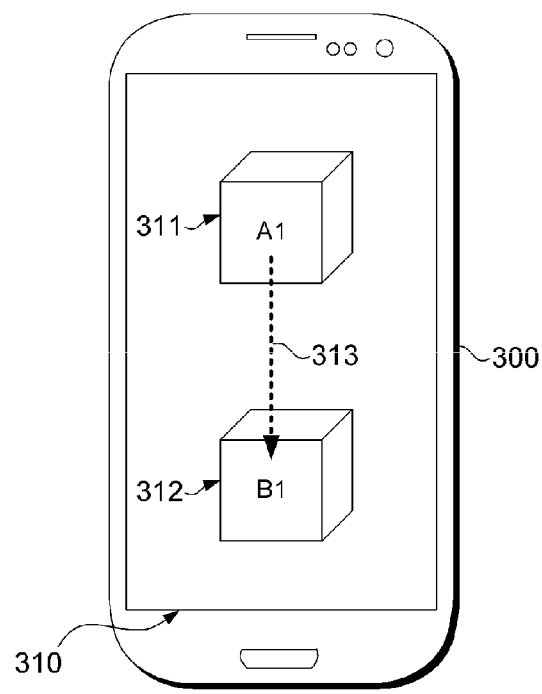

[Figure 4]
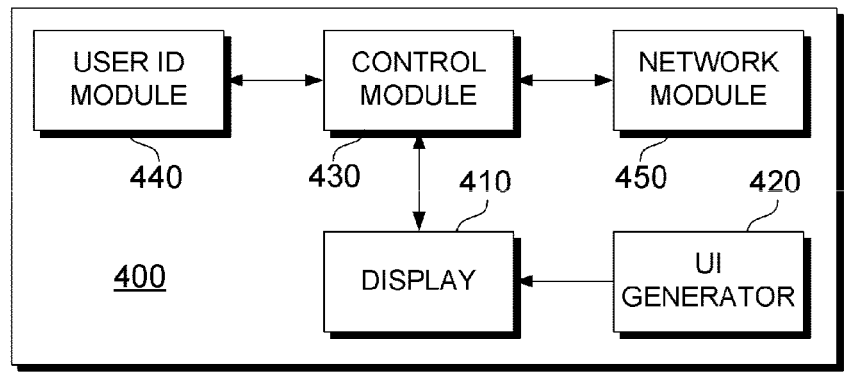
[Figure 5]
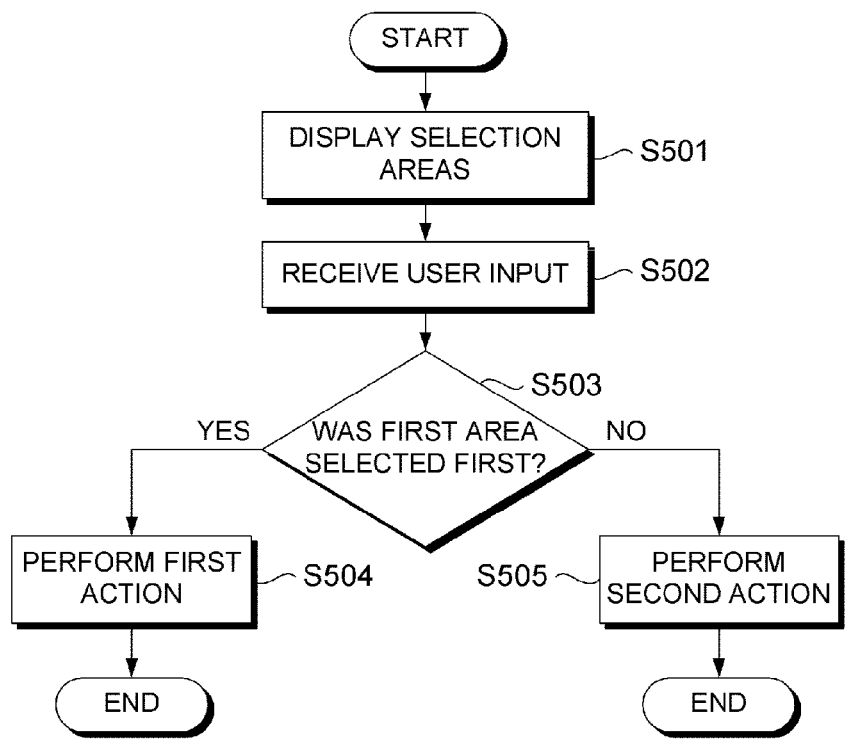

[Figure 6]
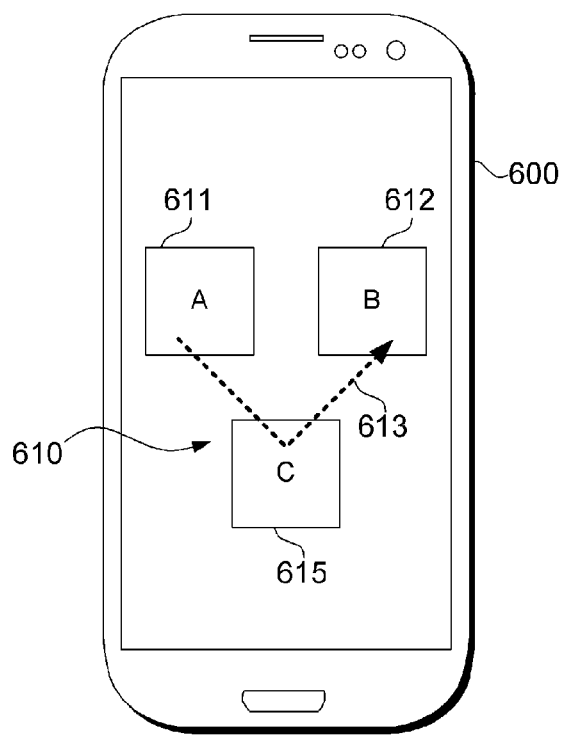
[Figure 7]
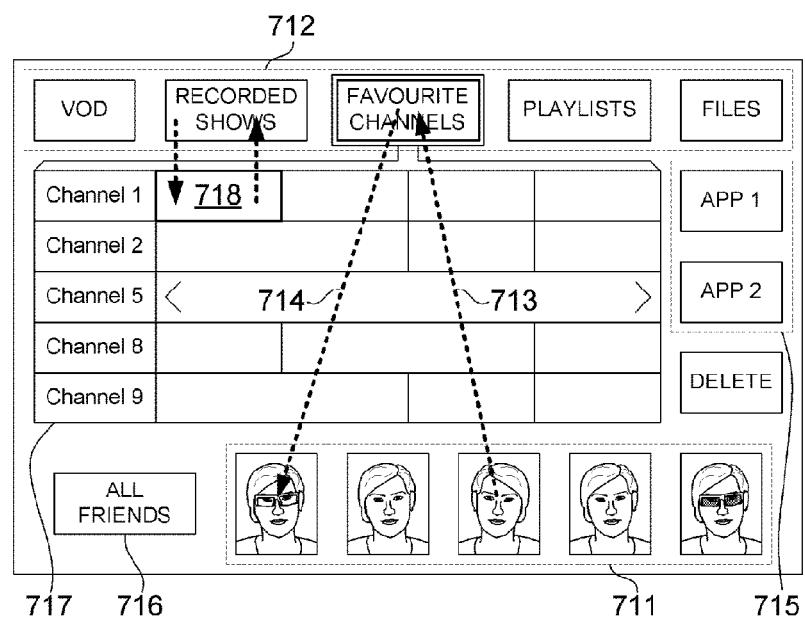

[Figure 8]
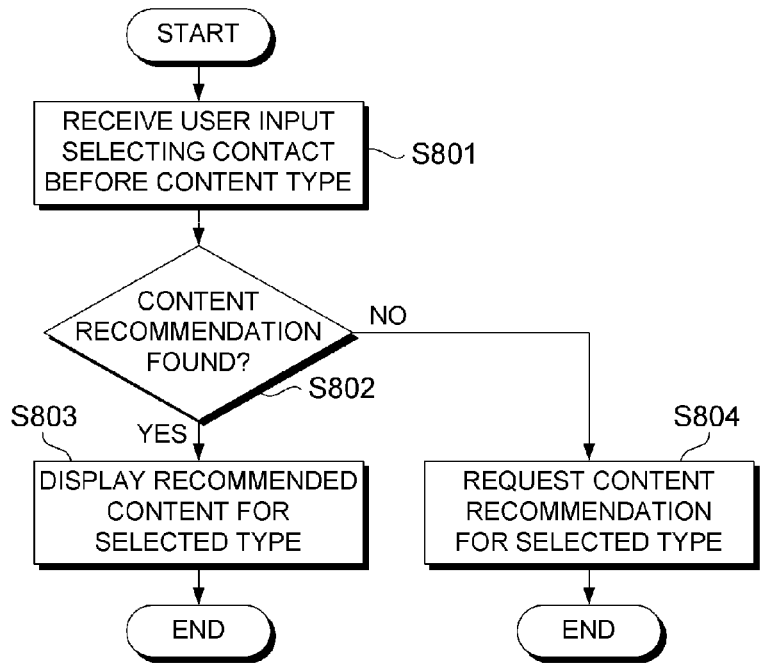
[Figure 9]
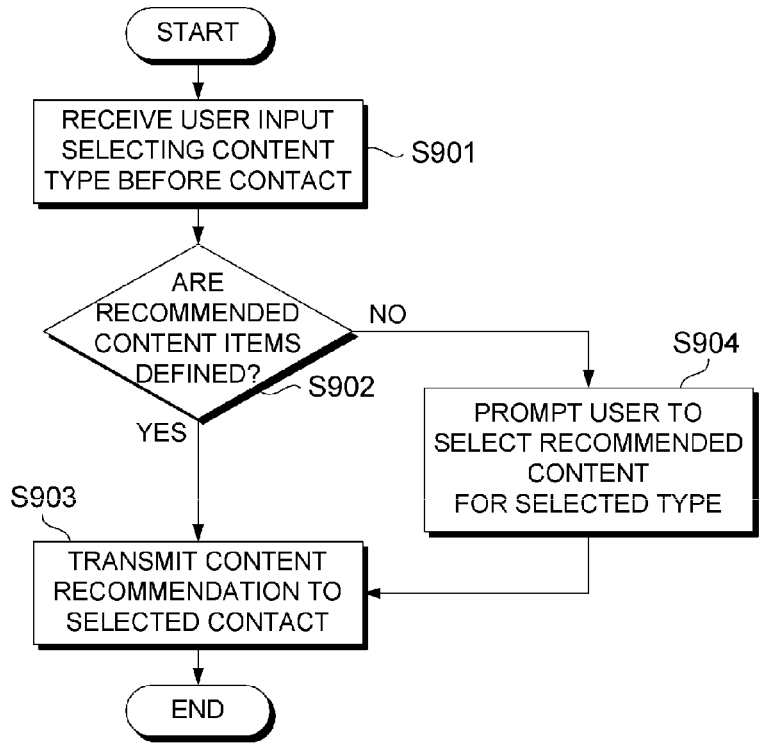

PERFORMING ACTIONS THROUGH A USER INTERFACE

This is a National Phase PCT application based on an International Application No. PCT/KR2013/007789 filed on Aug. 29, 2013; which claims priority from a British Patent Application No. 1215366.4 filed on Aug. 29, 2012, the disclosures of which are incorporated herein by reference in their entireties.

TECHNICAL FIELD

The present invention relates to a user interface. More particularly, the present invention relates to a user interface in which first and second areas are displayed, and different predetermined actions are performed according to an order in which the first and second areas are selected.

BACKGROUND ART

In devices which include a display, a conventional user interface allows a user to interact with the device by selecting areas of the display. For example, icons or tiles may be displayed to allow a user to select different applications. However, to perform a desired action, the user has to make a number of selections in a specific order. The more parameters are required for a particular action, the more input events, for example mouse clicks or taps on a touch screen, are required. As an example, to compose a new email to a contact, a user has to first find the required icon to select the email client, wait for the client to launch, select a new mail composition action, wait for the composition screen to open, and then input a recipient of the message either by selecting a contact from an address book or by typing in the recipient's address.

DISCLOSURE

Technical Problem

It would therefore be convenient for a user to be able to select the desired action in a more efficient manner, particularly as devices become more complex and additional applications and actions are introduced to provide additional functionality.

Technical Solution

There is provided a method for providing a user interface in a device, the method comprising displaying first and second selection areas on a display, the first selection area being an area for selecting an object, receiving user input selecting the first selection area and the second selection area, performing a first predetermined action for the selected object in response to the user input selecting the first selection area before the second selection area, and performing a second predetermined action for the selected object in response to the user input selecting the second selection area before the first selection area.

Advantageous Effects

According to the present invention, a user to be able to conveniently select desired action in a more efficient manner, particularly as devices become more complex and additional applications and actions are introduced to provide a additional functionality.

DESCRIPTION OF DRAWINGS

Embodiments of the invention will now be described, by way of example only, with reference to the accompanying drawings, in which:

FIG. 1 illustrates a user interface in a portable electronic device, according to an embodiment of the present invention;

FIG. 2 illustrates a user interface in a portable electronic device, according to another embodiment of the present invention;

FIG. 3 illustrates a user interface in a portable electronic device, according to a further embodiment of the present invention;

FIG. 4 illustrates a device according to an embodiment of the present invention;

FIG. 5 illustrates a method for providing a user interface in a device, according to an embodiment of the present invention;

FIG. 6 illustrates a user interface in a portable electronic device, according to a further embodiment of the present invention;

FIG. 7 illustrates a user interface for a device such as a connected television, according to an embodiment of the present invention;

FIG. 8 illustrates a method of displaying recommended content in the user interface of FIG. 7, according to an embodiment of the present invention; and FIG. 9 illustrates a method of recommending content to another user through the user interface of FIG. 7, according to an embodiment of the present invention.

BEST MODE

According to the present invention there is provided a method for providing a user interface in a device, the method comprising displaying first and second selection areas on a display, the first selection area being an area for selecting an object, receiving user input selecting the first selection area and the second selection area, performing a first predetermined action for the selected object in response to the user input selecting the first selection area before the second selection area, and performing a second predetermined action for the selected object in response to the user input selecting the second selection area before the first selection area.

The user input can select the first and second selection areas according to a first input method, and the method can further comprise performing a third predetermined action in response to user input selecting the first selection area according to a second input method different to the first input method, and performing a fourth predetermined action in response to user input selecting the second selection area according to the second input method.

The method can further comprise displaying a third selection area together with the first and second selection areas, and performing a fifth predetermined action for the selected object in response to the user input selecting the third selection area in addition to the first and second selection areas.

The third selection area can be an area for selecting an optional parameter relating to the first and/or second predetermined action, and performing the fifth predetermined action can comprise performing the first predetermined action modified by the optional parameter, in response to the user input selecting the first selection area before the second selection area and selecting the third selection area, and performing the second predetermined action modified by the optional parameter, in response to the user input selecting the second selection area before the first selection area and selecting the third selection area.

The third selection area can be a location selection area for selecting a location, or a date or time selection area for selecting a date or time. A date or time selection area may select a single date or time, or a date period or time period. If, for example, the first predetermined action comprises displaying multimedia files received from a selected contact, the fifth predetermined action can comprise filtering the multimedia files based on location to display those files received from the selected contact at the selected location, date or time. Similarly, if the second predetermined action comprises sending a selected multimedia file to a contact, the fifth predetermined action can comprise tagging the selected multimedia file with the selected location, date or time, and sending the tagged multimedia file to the contact.

The display can be a touch screen, and the user input can select the first, second and third selection areas by touching the first, second and third selection areas, or dragging the first and third selection areas to the second selection area, or dragging the first selection area to the second selection area via the third selection area, or dragging the first selection area to the second selection area while touching the third selection area.

A different fifth predetermined action can be performed depending on how the user input selects the first, second and third selection areas.

The display can be a touch screen, and the user input selecting the first selection area before the second selection area can comprise a drag gesture from the first selection area to the second selection area, and the user input selecting the second selection area before the first selection area can comprise a drag gesture from the second selection area to the first selection area.

The method can further comprise displaying a plurality of first selection areas, including the first selection area, as surfaces on a rotatable two-dimensional representation of a first three-dimensional object, and/or displaying a plurality of second selection areas, including the second selection area, as surfaces on a rotatable two-dimensional representation of a second three-dimensional object.

The first selection area can be an area for selecting a multimedia file, a data file, a document, another device, or an application as the selected object, and/or the second selection area can be an area for selecting a multimedia file, a data file, a document, another device, or an application.

The first selection area can be a current user selection area for selecting a current user of the device as the selected object.

The second selection area can be an area for selecting an email client, one of the first and second predetermined actions can comprise displaying an email composition area for composing a new email, and the other one of the first and second predetermined actions can comprise displaying information about emails sent by the current user.

The second selection area can be an area for selecting a social networking application, one of the first and second predetermined actions can comprise displaying a home page of the current user in the social networking application, and the other one of the first and second predetermined actions can comprise displaying a message composition area for composing a new message in the social networking application.

The new message can, depending on the social networking application, be a broadcast message to be received by all users of the social networking application, a selective broadcast message to be received by selected users, for instance users who are part of the current user's social network, or can be a direct message to a specific user.

The method can further comprise, prior to performing the first or second predetermined action, obtaining user identification data and identifying the current user of the device by comparing the obtained user identification data to known user identification data of one or more users of the device.

The current user can be identified before or after the selection areas are displayed, and before or after the user input is received.

The user identification data can be biometric data including at least one of facial image data, speech audio data, and fingerprint data.

The first selection area can be an area for selecting a contact as the selected object, and the second selection area can be a content type selection area for selecting a type of content.

One of the first and second predetermined actions can comprise: determining whether a content recommendation for the selected content type has been received from the selected contact, the content recommendation defining one or more recommended content items; and in response to a determination that a content recommendation has been received from the selected contact, performing an action with the one or more recommended content items, and the other one of the first and second predetermined actions can comprise: transmitting a content recommendation defining recommended content items to the selected contact.

The other one of the predetermined actions can further comprise, prior to transmitting the content recommendation: determining whether the recommended content items have been defined for the selected content type; and prompting a user to select one or more content items of the selected content type as the recommended content items, if the recommended content items have not been defined.

Performing the action with the one or more recommended content items can comprise: displaying information identifying the one or more recommended content items; and/or adding the one or more recommended content items to a stored list of preferred content items of the selected type; and/or obtaining the one or more recommended content items; and/or reproducing the one or more recommended content items.

In response to a determination that a content recommendation for the selected content type has not been received from the selected contact, the method can further comprise transmitting a request for the content recommendation to the selected contact.

The method can further comprise: receiving a request for a content recommendation from another device; prompting a user to select one or more content items of the selected content type as recommended content items; and transmitting the content recommendation defining the recommended content items to the other device.

The first predetermined action can comprise displaying the information identifying the one or more recommended content items, and the second predetermined action can comprise transmitting the content recommendation to the selected contact.

One or more of the recommended content items can be stored in a network storage unit, and the content recommendation can include a security token for accessing the recommended content items from the network storage unit.

The method can further comprise: ranking a plurality of contacts based on a history of content recommendations received from each of the plurality of contacts, by assigning a higher ranking to contacts with a history of recommending more relevant content; and displaying a predetermined number N of contact selection areas for selecting the N highest ranked contacts.

Ranking the plurality of contacts can comprise: assigning a higher ranking to one of the plurality of contacts if content recommended by the contact has been accessed more often by the current user of the device, in comparison to content recommended by another one of the plurality of contacts; and/or assigning a higher ranking to one of the plurality of contacts if content recommended by the contact has a higher popularity amongst other ones of the plurality of contacts, in comparison to content recommended by another one of the plurality of contacts.

The selected content type can be: video-on-demand VOD content available from a VOD server; or broadcast events in an electronic programme guide EPG; or recorded content stored in a local storage unit of the device or in a network storage unit accessible by the device; or a favourite channels list identifying favourite channels; or a playlist; or one or more predetermined file types; or images; or games; or applications.

The first selection area can be an area for selecting a contact as the selected object.

The method can further comprise displaying other first and/or second selection areas, in addition to the first selection area for selecting a contact. For example, the current user selection area can be displayed as well as the contact selection area, and/or as well as other first and/or second selection areas for selecting any combination of multimedia files, data files, documents, other devices, or applications.

The method can further comprise obtaining usage information for each one of a plurality of contacts including said contact, the usage information including information about how frequently each of the plurality of contacts is used, ordering the plurality of contacts based on the frequency of use of each one of the contacts, and displaying a predetermined number N of first selection areas for selecting the N most frequently used contacts.

The method can further comprise selecting an application prior to obtaining the usage information, wherein the usage information can include information about how frequently each of the plurality of contacts is used by the selected application, such that the plurality of contacts are ordered based on the frequency of use of each contact by the selected application.

The second selection area can be an area for selecting a call function, one of the first and second predetermined actions can comprise initiating a telephone call to the selected contact, and the other one of the first and second predetermined actions can comprise displaying information about calls made to and/or received from the contact.

The second selection area can be an area for selecting an email client, one of the first and second predetermined actions can comprise displaying an email composition area for composing a new email to the selected contact, and the other one of the first and second predetermined actions can comprise displaying information about emails received from the selected contact.

The second selection area can be an area for selecting a social networking application, one of the first and second predetermined actions can comprise displaying a home page of the selected contact in the social networking application, and the other one of the first and second predetermined actions can comprise displaying a message composition area for composing a new message to the selected contact in the social networking application.

The second selection area can be an area for selecting a file, one of the first and second predetermined actions can comprise sending the selected file to the selected contact, and the other one of the first and second predetermined actions can comprise displaying information about files received from the selected contact.

The information about files received from the selected contact can comprise information about files of the same type as the selected file.

According to the present invention, there is also provided a method for providing a user interface in a device, the method comprising displaying an object selection area for selecting an object and an action selection area for selecting an action to be performed for the object, receiving user input selecting the object selection area and the action selection area, and performing a different predetermined action for the selected object according to whether the user input selects the object before the action or selects the action before the object.

The different predetermined actions can be selected based on grammatical rules.

The user input can select the object and action selection areas according to a first input method, and the method can further comprise performing a third predetermined action in response to user input selecting the object selection area according to a second input method different to the first input method, and performing a fourth predetermined action in response to user input selecting the action selection area according to the second input method.

According to the present invention, there is also provided a method for providing a user interface in a device, the method comprising displaying first and second symbols on a display, receiving user input selecting the first and second symbols, and performing a different predetermined action according to an order in which the user input selects the first and second symbols.

The user input can select the first and second symbols according to a first input method, and the method can further comprise performing a third predetermined action in response to user input selecting the first symbol according to a second input method different to the first input method, and performing a fourth predetermined action in response to user input selecting the second symbol according to the second input method.

The device can be a portable electronic device such as a mobile telephone, smartphone, personal digital assistant (PDA), electronic book (also referred to as an e-book or e-reader), laptop computer or tablet computer, or any other device including a display such as a television, desktop computer, or 'connected' appliance such as a connected fridge or microwave oven.

According to the present invention, there is also provided a computer-readable storage medium arranged to store a computer program which, when executed by a device, causes the device to perform the method of any one of the preceding claims.

According to the present invention there is further provided a device comprising a display, a user interface generator arranged to display first and second selection areas on the display, the first selection area being an area for selecting an object, and a control module arranged to receive user input selecting the first selection area and the second selection area, perform a first predetermined action for the selected object in response to the user input selecting the first selection area before the second selection area, and perform a second predetermined action for the selected object in response to the user input selecting the second selection area before the first selection area.

The control module can be arranged to receive the user input selecting the first and second selection areas according to a first input method, and can be further arranged to perform a third predetermined action in response to user input selecting the first selection area according to a second input method different to the first input method, and to perform a fourth predetermined action in response to user input selecting the second selection area according to the second input method.

The user interface generator can be further arranged to display a third selection area together with the first and second selection areas on the display, and the control module can be further arranged to perform a fifth predetermined action for the selected object in response to the user input selecting the third selection area in addition to the first and second selection areas.

The third selection area can be an area for selecting an optional parameter relating to the first and/or second predetermined action, and the control module can be arranged to perform the fifth predetermined action by performing the first predetermined action modified by the optional parameter, in response to the user input selecting the first selection area before the second selection area and selecting the third selection area, and can be arranged to perform the fifth predetermined action by performing the second predetermined action modified by the optional parameter, in response to the user input selecting the second selection area before the first selection area and selecting the third selection area.

The third selection area can be a location selection area for selecting a location, or a date or time selection area for selecting a date or time. A date or time selection area may select a single date or time, or a date period or time period. If, for example, the first predetermined action comprises displaying multimedia files received from a selected contact, the fifth predetermined action can comprise filtering the multimedia files based on location to display those files received from the selected contact at the selected location, date or time. Similarly, if the second predetermined action comprises sending a selected multimedia file to a contact, the fifth predetermined action can comprise tagging the selected multimedia file with the selected location, date or time, and sending the tagged multimedia file to the contact.

The display can be a touch screen and the control module can be arranged to receive the user input through the touch screen, the user input selecting the first, second and third selection areas by touching the first, second and third selection areas, or dragging the first and third selection areas to the second selection area, or dragging the first selection area to the second selection area via the third selection area, or dragging the first selection area to the second selection area while touching the third selection area.

A different fifth predetermined action can be performed depending on how the user input selects the first, second and third selection areas.

The display can be a touch screen and the control module can be arranged to receive the user input through the touch screen, the user input selecting the first selection area before the second selection area can comprise a drag gesture from the first selection area to the second selection area, and the user input selecting the second selection area before the first selection area can comprise a drag gesture from the second selection area to the first selection area.

The user interface generator can be arranged to display a plurality of first selection areas, including the first selection area, as surfaces on a rotatable two-dimensional representation of a first three-dimensional object, and/or to display a plurality of second selection areas, including the second selection area, as surfaces on a rotatable two-dimensional representation of a second three-dimensional object.

The first selection area can be an area for selecting a multimedia file, a data file, a document, another device, or an application as the selected object, and/or the second selection area can be an area for selecting a multimedia file, a data file, a document, another device, or an application.

The first selection area can be a current user selection area for selecting a current user of the device as the selected object.

The second selection area can be an area for selecting an email client, one of the first and second predetermined actions can comprise displaying an email composition area for composing a new email, and the other one of the first and second predetermined actions can comprise displaying information about emails sent by the current user.

The second selection area can be an area for selecting a social networking application, one of the first and second predetermined actions can comprise displaying a home page of the current user in the social networking application, and the other one of the first and second predetermined actions can comprise displaying a message composition area for composing a new message in the social networking application.

The new message can, depending on the social networking application, be a broadcast message to be received by all users of the social networking application, a selective broadcast message to be received by selected users, for instance users who are part of the current user's social network, or can be a direct message to a specific user.

The device can further comprise a user identification module arranged to obtain user identification data and to identify the current user of the device by comparing the obtained user identification data to known user identification data of one or more users of the device, prior to the control module performing the first or second predetermined action.

The current user can be identified before or after the selection areas are displayed, and before or after the user input is received.

The user identification data can be biometric data including at least one of facial image data, speech audio data, and fingerprint data.

The first selection area can be an area for selecting a contact as the selected object, and the second selection area can be a content type selection area for selecting a type of content.

One of the first and second predetermined actions can comprise: determining whether a content recommendation for the selected content type has been received from the selected contact, the content recommendation defining one or more recommended content items; and in response to a determination that a content recommendation has been received from the selected contact, performing an action with the one or more recommended content items, and the other one of the first and second predetermined actions can comprise: transmitting a content recommendation defining recommended content items to the selected contact.

The other one of the predetermined actions can further comprise, prior to transmitting the content recommendation: determining whether the recommended content items have been defined for the selected content type; and prompting a user to select one or more content items of the selected content type as the recommended content items, if the recommended content items have not been defined.

The device can be arranged to perform the action with the one or more recommended content items by: displaying information identifying the one or more recommended content items; and/or adding the one or more recommended content items to a stored list of preferred content items of the selected type; and/or obtaining the one or more recommended content items; and/or reproducing the one or more recommended content items.

The device can further comprise a communications module, wherein in response to a determination that a content recommendation for the selected content type has not been received from the selected contact, the device can be arranged to control the communications module to transmit a request for the content recommendation to the selected contact.

The device can further comprise a communications module arranged to receive a request for a content recommendation from another device, wherein in response to the request for a content recommendation, the device can be arranged to control the user interface generator to prompt a user to select one or more content items of the selected content type as recommended content items, and to control the communications module to transmit the content recommendation defining the recommended content items to the other device.

The first predetermined action can comprise displaying the information identifying the one or more recommended content items, and the second predetermined action can comprise transmitting the content recommendation to the selected contact.

One or more of the recommended content items can be stored in a network storage unit, and the content recommendation can include a security token for accessing the recommended content items from the network storage unit.

The user interface generator can be arranged to rank a plurality of contacts based on a history of content recommendations received from each of the plurality of contacts, by assigning a higher ranking to contacts with a history of recommending more relevant content, and display a predetermined number N of contact selection areas for selecting the N highest ranked contacts.

The user interface generator can be arranged to rank the plurality of contacts by assigning a higher ranking to one of the plurality of contacts if content recommended by the contact has been accessed more often by the current user of the device, in comparison to content recommended by another one of the plurality of contacts; and/or assigning a higher ranking to one of the plurality of contacts if content recommended by the contact has a higher popularity amongst other ones of the plurality of contacts, in comparison to content recommended by another one of the plurality of contacts.

The selected content type can be: video-on-demand VOD content available from a VOD server; or broadcast events in an electronic programme guide EPG; or recorded content stored in a local storage unit of the device or in a network storage unit accessible by the device; or a favourite channels list identifying favourite channels; or a playlist; or one or more predetermined file types; or images; or games; or applications.

The first selection area can be an area for selecting a contact as the selected object.

The user interface generator can be further arranged to display other first and/or second selection areas, in addition to the first selection area for selecting a contact, on the display. For example, the current user selection area can be displayed as well as the contact selection area, and/or as well as other first and/or second selection areas for selecting any combination of multimedia files, data files, documents, other devices, or applications.

The user interface generator can be arranged to obtain usage information for each one of a plurality of contacts including said contact, the usage information including information about how frequently each of the plurality of contacts is used, order the plurality of contacts based on the frequency of use of each one of the contacts, and display a predetermined number N of first selection areas for selecting the N most frequently used contacts.

Prior to the user interface generator obtaining the usage information the device can be arranged to select an application, and the usage information can include information about how frequently each of the plurality of contacts is used by the selected application, such that the user interface generator is arranged to order the plurality of contacts based on the frequency of use of each contact by the selected application.

The second selection area can be an area for selecting a call function, one of the first and second predetermined actions can comprise initiating a telephone call to the selected contact and the other one of the first and second predetermined actions can comprise displaying information about calls made to and/or received from the contact.

The second selection area can be an area for selecting an email client, one of the first and second predetermined actions can comprise displaying an email composition area for composing a new email to the selected contact, and the other one of the first and second predetermined actions can comprise displaying information about emails received from the selected contact.

The second selection area can be an area for selecting a social networking application, one of the first and second predetermined actions can comprise displaying a home page of the selected contact in the social networking application, and the other one of the first and second predetermined actions can comprise displaying a message composition area for composing a new message to the selected contact in the social networking application.

The second selection area can be an area for selecting a file, one of the first and second predetermined actions can comprise sending the selected file to the selected contact, and the other one of the first and second predetermined actions can comprise displaying information about files received from the selected contact.

The information about files received from the selected contact can comprise information about files of the same type as the selected file.

According to the present invention, there is further provided a device comprising a display, a user interface generator arranged to display an object selection area for selecting an object and an action selection area for selecting an action to be performed for the object, on the display, and a control module arranged to receive user input selecting the object selection area and the action selection area, and perform a different predetermined action for the selected object according to whether the user input selects the object before the action or selects the action before the object.

The control module can be arranged to select the different predetermined actions based on grammatical rules.

The control module can be arranged to receive the user input selecting the object and action selection areas according to a first input method, and can be further arranged to performing a third predetermined action in response to user input selecting the object selection area according to a second input method different to the first input method, and to perform a fourth predetermined action in response to user input selecting the action selection area according to the second input method.

According to the present invention there is further provided a device comprising a display, a user interface generator arranged to display first and second symbols on the display, and a control module arranged to receive user input selecting the first and second symbols, and to perform a different predetermined action according to an order in which the user input selects the first and second symbols.

The control module can be arranged to receive the user input selecting the first and second symbols according to a first input method, and can be further arranged to perform a third predetermined action in response to user input selecting the first symbol according to a second input method different to the first input method, and to perform a fourth predetermined action in response to user input selecting the second symbol according to the second input method.

The device can be a portable electronic device such as a mobile telephone, smartphone, personal digital assistant (PDA), electronic book (also referred to as an e-book or e-reader), laptop computer or tablet computer, or any other device including a display such as a television, desktop computer, or 'connected' appliance such as a connected fridge or microwave oven.

MODE FOR INVENTION

Referring now to FIG. 1, a user interface in a portable electronic device is illustrated, according to an embodiment of the present invention. The portable electronic device 100 is a smartphone including a display 110, which in the present embodiment is a touch screen. A user interface including a first selection area 111 and a second selection area 112 is displayed on the touch screen 110. Although in the present embodiment a smartphone 100 is illustrated, in general embodiments of the present invention can be applied to any type of device that includes a display for displaying a user interface. For example, alternative embodiments of the present invention include, but are not limited to, a tablet computer, laptop computer, desktop computer, or any home appliance that includes a display, such as a 'connected' fridge, television or microwave oven.

Depending on an order in which the selection areas 111, 112 are selected by user input, a different action can be performed. In the present embodiment the selection areas 111, 112 are selected by user input in the form of a drag gesture 113 from one of the selection areas to the other. However, in other embodiments different input methods and interface types other than a touch screen can be used. For instance, touchless interaction could be used to select the areas in order in devices which are configured for touchless interaction. Examples of touchless interaction methods include motion sensing, by capturing images of part or whole of a user's body and using pattern recognition software to detect gestures, speech recognition, and eye sensing to detect a direction in which a user is looking.

The different actions performed can depend on what is selected by the first and second selection areas 111, 112. For example, the first selection area 111 may be a contact selection area for selecting a contact from a list of contacts stored in the smartphone 100, and the second selection area 112 may be a selection area for selecting a social networking application. In this example the first selection area 111 could be displayed as an image associated with the contact, and the second selection area 112 can be displayed as an icon or logo associated with the application, although it will be appreciated that other approaches are also possible. When the contact is selected before the social networking application, the device 100 can respond by displaying a home page of the selected contact in the social networking application. When the social networking application is selected before the contact, the device 100 can respond by displaying a message composition area for composing a new message to the selected contact in the social networking application.

It will be appreciated that the present invention is not limited to the above example, and in other embodiments different actions may be taken depending on what is being selected by the first and second selection areas, and depending on the order in which the areas are selected. In some embodiments, the action to be taken is predetermined based on grammatical rules. When the order of selection is 'object+verb', a different action is performed in comparison to when the order of selection is 'verb+object'. In the above example, the first selection area 111 selects a contact, which can be considered as an object (noun, e.g. 'Liza'), and the second selection area 112 selects an application, which can be considered as an action (verb, e.g. 'message'). Hence when a user performs a first drag gesture 113 selecting the first selection area 111 before the selection area 112, in the order 'object+verb', the predetermined action can be to display messages sent by that contact. On the other hand, when a user performs a second drag gesture 114 selecting the second selection area 112 before the first selection area 111, in the order 'verb+object', the predetermined action can be to compose a new message to that contact, that is, to perform the action on the selected object. In other embodiments however the predetermined action to be performed can be selected differently, that is, not based on grammatical rules.

Although an example has been described in which a contact and a messaging application are selected, the present invention is not limited to this example. In another example the second selection area can be an area for selecting a call function, one of the first and second predetermined actions can comprise initiating a telephone call to the selected contact, and the other one of the first and second predetermined actions can comprise displaying information about calls made to and/or received from the contact.

As another example, the second selection area can be an area for selecting an email client, one of the first and second predetermined actions can comprise displaying an email composition area for composing a new email to the selected contact, and the other one of the first and second predetermined actions can comprise displaying information about emails received from the selected contact.

As another example, the second selection area can be an area for selecting a social networking application, one of the first and second predetermined actions can comprise displaying a home page of the selected contact in the social networking application, and the other one of the first and second predetermined actions can comprise displaying a message composition area for composing a new message to the selected contact in the social networking application.

As another example, the second selection area can be an area for selecting a file, one of the first and second predetermined actions can comprise sending the selected file to the selected contact, and the other one of the first and second predetermined actions can comprise displaying information about files received from the selected contact. The information about files received from the selected contact can comprise information about files of the same type as the selected file.

Embodiments of the present invention are also not limited to performing actions for selected contacts. In other embodiments the first selection area may not be an area for selecting a contact, but could be an area for selecting another type of object such as a file. As an example, in response to the user input selecting the file and then an email application, one of the first and second predetermined actions can comprise displaying an email composition area to compose an email with the selected file included as an attachment, and the other one of the first and second predetermined actions can comprise displaying information about files of the same type received as attachments through the email client.

Referring now to FIG. 2, a user interface in a portable electronic device is illustrated according to another embodiment of the present invention. Here, as in FIG. 1, the portable electronic device 200 is a smartphone including a display 210, which again is a touch screen. The display 210 displays a plurality of first selection areas 211-1, 211-2, 211-3, 211-4, labelled 'ME', 'A1', 'A2' and 'A3'. The display also displays a plurality of second selection areas 212-1, 212-2, 212-3, 212-4, labelled 'B1', 'B2', 'B3' and 'B4'. The device 200 can receive user input in the form of a drag event 213 from any one of the first selection areas 211-1, 211-2, 211-3, 211-4 to any one of the second selection areas 212-1, 212-2, 212-3, 212-4, or vice versa. Alternatively the device 200 can be configured to receive user input according to a different input method through the touch screen 210, in the form of other gestures or interactions such as single-touch events, which can select the selection areas in sequence.

As shown in FIGS. 1 and 2, in general an embodiment of the present invention can display any number of one or more first selection areas, and any number of one or more selection areas. The first and second selection areas can be displayed in different regions of the display, as in FIG. 2 where they are displayed on opposite sides of the display, or can be interspersed with one another such that first selection areas are displayed amongst second selection areas.

In the present embodiment the plurality of first selection areas 211-1, 211-2, 211-3, 211-4 includes a 'ME' selection area 211-1 and three contact selection areas 211-2, 211-3, 211-4, for selecting contacts from a list of contacts. For instance, the contacts may be stored locally in the device as telephone contacts in the current user's phone book and/or as email contacts in the current user's email address book, and/or may be contacts of the current user in a social networking application. The 'ME' selection area is an area for selecting the current user of the portable electronic device 200 as a selected object for which the predetermined action is to be performed.

An example has been described above with reference to FIG. 1 in which certain actions are taken when a contact is dragged to a social networking application or vice versa. In the user interface shown in FIG. 2, when user input selects the 'ME' selection area, which can be referred to as a current user selection area, before selecting a social networking application selection area 212-1, the device 200 can display a new message composition area for composing a new message in the social networking application. The new message can, depending on the social networking application, be a broadcast message to be received by all users of the social networking application, a selective broadcast message to be received by selected users, for instance users who are part of the current user's social network, or can be a direct message to a specific user. Alternatively, when the user input selects the social networking application selection area before the current user selection area, the device 200 can display the current user's home page in the social networking application.

It will be appreciated that the present invention is not limited to these actions, and in other embodiments the selection orders for these actions could be reversed or different predetermined actions could be selected.

As another example, the user input can select the current user selection area 212-1 and a second selection area which is an area 212-2 for selecting an email client. Depending on the selection order, the device can display an email composition area for composing a new email, or can display information about emails sent by the current user.

In some embodiments, a device may be set up to support a plurality of different users, each of whom may, for example, have different profiles for use in applications selected by the second selection areas. In such embodiments the device can be arranged to identify the current user before performing the predetermined action, so that the correct information for the current user can be retrieved and used when performing the action. For instance, if the action involves composing a new email the device may need to retrieve the current user's email address and email server settings, such as server address, username and password. If the action involves composing a new message in a social networking application, or displaying the current user's home page, the device may need to retrieve the current user's account details.

The device can identify the current user before or after the selection areas are displayed, and before or after the user input is received, provided that the current user is identified prior to performing the first or second predetermined action. To identify the current user, the device is arranged to obtain user identification data and identify the current user of the portable electronic device by comparing the obtained user identification data to known user identification data of one or more users of the device. The user identification data can be biometric data including at least one of facial image data, speech audio data, and fingerprint data. The biometric data could be obtained by suitable hardware included in the device, for example one or more of a camera, microphone and/or fingerprint scanner. Alternatively, the user identification data could be data such as a user name and password input by the user.

When a plurality of contact selection areas are displayed, as shown in FIG. 2, various approaches are possible. The contact selection areas can be displayed by ordering the contacts alphabetically, and allowing a user to scroll through the list of contacts if there is insufficient space to display all the contacts on the display screen 210 at the same time.

Alternatively, the contacts can be ordered according to a frequency of use of each contact. Specifically, the device can obtain usage information for each one of the plurality of contacts, the usage information including information about how frequently each of the plurality of contacts is used. The device can use the information to order the contacts and display a predetermined number N of first selection areas for selecting the N most frequently used contacts. The predetermined number N can be the maximum number of contacts for which there is space to be displayed on the screen at any one time. If there are more than N contacts a user may be able to scroll through the list to view the remaining contacts, also ordered according to usage frequency.

To allow a user to scroll through a plurality of selection areas, different approaches are possible. For example, when a plurality of selection areas are displayed in an array as shown in FIG. 2, the device may be arranged to allow a user to scroll the entire array together in a plurality of directions, for instance vertical, horizontal, and/or diagonal directions, and/or may be arranged to allow a single row or column to be scrolled in a plurality of directions whilst other rows or columns are kept stationary. As a further example, one input method could be used to activate scrolling of the entire array, for instance a two-finger scroll gesture, and a different input method could be used to activate scrolling of a single row or column, for instance a one-finger scroll gesture over the row or column to be scrolled. The above-described methods are only exemplary and it will be appreciated that other scrolling methods could be used in other embodiments.

Furthermore, in some embodiments the device may be arranged to allow an application to be selected prior to obtaining the usage information. For example, before performing a drag gesture to select one of the predetermined actions to be performed for one of the contacts, a user can tap one of the second selection areas for an application to select that application, and the contacts can be reordered according to a frequency of use of each contact by that application. Here, the device can obtain usage information about how frequently each of the plurality of contacts is used by the selected application.

The usage information can be stored in the device and updated each time a contact is accessed through one of the applications. Alternatively, the usage information could be stored in a remote server, for example a social networking server accessed through a social networking application, and retrieved from the remote server after the social networking application has been selected.

Referring now to FIG. 3, a user interface in a portable electronic device is illustrated, according to a further embodiment of the present invention. As with FIGS. 1 and 2, in the present embodiment the portable electronic device 300 is a smartphone including a touch screen display 310. However, in the present embodiment the device is arranged to display a plurality of first selection areas on faces of a first three-dimensional object 311, in this case a cube. A plurality of second selection areas are also displayed on faces of a second three-dimensional object 312. Specifically, two-dimensional representations of the three-dimensional objects 311, 312 are displayed, which can be rotated in response to a user touching and/or dragging parts of the objects 311, 312 in a certain manner. The user can rotate the objects 311, 312 until the desired first and second selection areas are displayed, and can then select the predetermined action to be performed by performing a drag gesture 313 from the first selection area to the second selection or vice versa.

Embodiments have been described above with reference to FIGS. 1, 2 and 3 in which the user input is a drag event, which can also be referred to as a drag gesture. For example, in a first drag event 113 in FIG. 1, a user touches the touch screen and drags from the first selection area 111 to the second selection area 112. The first drag event 113 therefore selects the first selection area 111 before selecting the second selection area 112. In a second drag event 114, a user touches the touch screen and drags from the second selection area 112 to the first selection area 111. The second drag event 114 therefore selects the second selection area 112 before selecting the first selection area 111. When dragging from one selection area to the other selection area, a user can start and finish the drag event within the selection areas 111, 112, or can pass through the selection areas but start and finish elsewhere on the display 110.

The user interface of the present embodiment can be referred to as a 'direction-sensitive' user interface, as the device 100 responds differently according to the direction of user input. Although in FIG. 1 the first and second drag events 113, 114 are illustrated as occurring in opposite directions, this is not essential provided the selection areas are selected in the opposite order in the different drag events 113, 114. That is, in general drag events can occur in straight or curved lines, and do not have to be horizontal but can follow any path that passes from the first selection area 111 to the second selection area 112, or vice versa. Alternatively, instead of a drag gesture a user could sequentially select the selection areas 111, 112 in order using a different input method, for instance by double-tapping the first one of the selection areas 111, 112 to be selected and single-tapping the second one of the selection areas 111, 112 to be selected. In general, the user input can be any user input that selects two selection areas in order.

Referring now to FIG. 4, a device is illustrated according to an embodiment of the present invention. The device 400 includes a display 410, user interface generator 420 arranged to display first and second selection areas on the display, and a control module 430. The device 400 further comprises a user identification module 440 for identifying a current user if a current user selection area, shown as a 'ME' icon in FIG. 2, is provided. In embodiments which do not feature a current user selection area, the user identification module 440 can be omitted. The user interface generator 420, control module 430, and user identification module 440 can be separate hardware components in the device 400, or can be embodied as software modules in a set of computer program instructions executed by a processor in the device 400.

The device further comprises a communications module 450 arranged to transmit and receive communications to/from another device. In the present embodiment, the communications module 450 is a network interface arranged to connect to a network, for example a mobile telecommunications network, wireless local area network (WLAN) or local area network (LAN). The device can use the communications module 450 to communicate with other devices, for example to send or receive multimedia content, documents, images, emails, social networking service (SNS) messages, and so on.

The control module 430 is arranged to receive user input selecting the first selection area and the second selection area, perform a first predetermined action for the selected object in response to the user input selecting the first selection area before the second selection area, and perform a second predetermined action for the selected object in response to the user input selecting the second selection area before the first selection area. As described above with reference to FIGS. 1, 2 and 3, in general the user interface generator 420 may display any number, that is, one or more first selection areas, and one or more second selection areas.

The control module 430 can receive the user input in various ways. In embodiments in which the display 410 is a touch screen, the control module 430 can receive the user input through the touch screen 410. In other embodiments, when a touch screen is not used the control module 430 can receive the user input from a separate user interface device, for example a keyboard, mouse, touchpad, trackball, or a touchless user interface based on techniques such as motion recognition, eye tracking or speech recognition.

Referring now to FIG. 5, a method for providing a user interface in a device is illustrated, according to an embodiment of the present invention. The method can be performed by any of the devices shown in FIGS. 1 to 4. First, in step S501 first and second selection areas are displayed on a display. Then, in step S502, user input is received. Next, in step S503 the order in which the first and second selection areas were selected is checked. If the first selection area was selected first, then in step S504 a first predetermined action is performed. Alternatively, if the second selection area was selected first, then in step S505 a second predetermined action is performed.

Referring now to FIG. 6, a user interface in a portable electronic device is illustrated according to a further embodiment of the present invention. In this embodiment, the portable electronic device 600 is arranged to display first, second and third selection areas 611, 612, 615 on a touch screen 610. The use of a third selection area 615 allows a user to easily select another different predetermined action to be performed by the device 600.

In more detail, the third selection area can be an area for selecting an optional parameter relating to the first and/or second predetermined action. For example, the third selection area can be a location selection area for selecting a location, or a date or time selection area for selecting a date or time. A date or time selection area may select a single date or time, or a date period or time period.

In the example illustrated in FIG. 6, user input is received as a drag event 613 from the first selection area 611 to the second selection area 612 via the third selection area 615. In the present embodiment, the device responds by performing a different predetermined action, which is the first predetermined action modified by the optional parameter. If, for example, the first predetermined action comprises displaying multimedia files received from a selected contact, the different predetermined action can comprise filtering the multimedia files based on location to display those files received from the selected contact at the selected location, date or time. In response to a drag event in the other direction, that is, from the second selection area 612 to the first selection area 611 via the third selection area 615, the different predetermined action comprises performing the second predetermined action modified by the optional parameter. For example, if the second predetermined action comprises sending a selected multimedia file to a contact, the different predetermined action can comprise tagging the selected multimedia file with the selected location, date or time, and sending the tagged multimedia file to the contact.

As with the above-described embodiments, different input methods can be used to select the first, second and third selection areas. For example, when the display is a touch screen, the user input can select the first, second and third selection areas by touching the first, second and third selection areas, or dragging the first and third selection areas to the second selection area, or dragging the first selection area to the second selection area via the third selection area, or dragging the first selection area to the second selection area while touching the third selection area. A different fifth predetermined action can be performed depending on how the user input selects the first, second and third selection areas.

Also, in the embodiments shown in FIGS. 1, 2, 3 and 6, selection areas are illustrated as squares including text. However, in general a selection area can refer to any area on the display 110 that can be selected by user input. Selection areas can take any shape and size, and can for example be displayed as conventional icons, widgets, or tiles. A selection area can include text and/or images, or could simply be a coloured or shaded region. A selection area may also be referred to as a symbol.

Referring now to FIG. 7, a user interface for a device such as a connected television is illustrated, according to an embodiment of the present invention. A connected television is a television which includes a network module for accessing the Internet through a network connection. Apparatus for providing the user interface, such as that shown in FIG. 4, can be integrated into the television or can be provided separately, for example as a set-top box (STB). In some embodiments, the apparatus for providing the user interface can be Cloud-based, so that the television or other display device receives the user interface screens over the Internet from the Cloud.

In the present embodiment, the user interface includes a plurality of contact selection areas 711, each of which is an area for selecting one of a plurality of contacts. The contact selection areas 711 are equivalent to the first selection areas in the above-described embodiments, for example the contact selection areas 211-2, 211-3, 211-4 shown in FIG. 2.

The user interface also includes a plurality of content type selection areas 712. The content type selection areas 712 enable a user to filter content according to the content type, making it easier for a user to search and access relevant content. Each content selection area 712 can be selected to select a different type of content accessible through the television.

In the present embodiment the available content types include "video-on-demand" (VOD) content available from a VOD server, "recorded shows" for selecting content stored in a local storage unit of the device or in a network storage unit accessible by the device (e.g. cloud-based storage), "favourite channels" for selecting a list of favourite channels, "playlists" for selecting playlists of multimedia files, and "files" for selecting one or more predetermined file types, for example stored images or documents.

In the present example a user has selected the "favourite channels" content type, and accordingly an Electronic Programme Guide (EPG) including the user's favourite channels (in this case, channel numbers 1, 2, 5, 8 and 9) are displayed in a content item selection area 717. In the present embodiment, a user can customise the EPG using a "DELETE" selection area included in the user interface, by dragging a channel from the EPG to the "DELETE" selection area to delete that channel from the EPG. Here, 'deleting' the channel means that the channel is no longer displayed in the EPG. In response to user input in the opposite direction, dragging the "DELETE" selection area to the EPG, the device can be arranged to repopulate the EPG with the previously deleted channels, by adding the previously deleted channels hack into the channel list in the EPG.

The present invention is not limited to the content types shown in FIG. 7. Examples of other content types that can be selected to filter content items in other embodiments include a "broadcast programmes" content type for selecting broadcast events in an electronic programme guide EPG, an "application" content type for selecting, for example, a social networking application, an email application and a video calling application, and "games" for accessing games installed on the device.

As in the above-described embodiment, in the present embodiment the device (e.g. television or connected STB) is arranged to perform a first predetermined action in response to user input selecting one of the contact selection areas 711 before one of the content type selection areas 712, and a second predetermined action in response to user input selecting one of the content type selection areas 712 before one of the contact selection areas 711. That is, a different predetermined action is performed depending on the direction of the user input.

In the present embodiment, the television includes a gesture-recognition interface arranged to detect a user's gesture from captured video. In the example shown in FIG.

7, first user input 713 is received in the form of a drag gesture from one of the contact selection areas 711 to one of the content type selection areas 712, and second user input 714 is received in the form of a drag gesture from one of the content type selection areas 712 to one of the contact selection areas 711. However, in other embodiments different types of interface may be used to receive the user input.

The first predetermined action, which is performed in response to the first user input 713 shown in FIG. 7, is to display information about content of the selected content type, which has been recommended by the selected contact. The second predetermined action, which is performed in response to the second user input 714 shown in FIG. 7, is to recommend content of the selected type to the selected contact. The first and second predetermined actions will be described in more detail later with reference to FIGS. 8 and 9.

When recommending content to another user, the content recommendation can be transmitted immediately, or can be transmitted at some time in the future. For example, the device can periodically transmit updates about recommended content to each contact. In some embodiments, substantially immediate transmission of content recommendations may be advantageous, to enable real-time interaction between users. For example, when for a content recommendation defining a content item which is a programme currently being broadcast, the content recommendation can be transmitted as soon as the user drags the content item, or corresponding content type selection area, to a contact selection area. When a device receives a content recommendation for a programme currently being broadcast, the device can notify the user that a recommendation has been received, for example by displaying a message asking the user whether they would like to begin watching the recommended programme.

In a related example, a user can recommend a game to one of their contacts by dragging a content item selection area for that game to the contact selection area for that contact. When a content recommendation is received for a game, the other device can be arranged to display an invitation to begin playing the game. In response to user input in the other direction, dragging the contact selection area to a "game" content type selection area, the device can be arranged to display a list of games recommended by that contact, which could for example include all games installed on the contact's own device, or could be a list of their favourite games.

It will be understood that real-time notification of recommended content is not limited to the above-described examples, and can also be extended to other content types. For example, when the device receives a content recommendation defining VOD content, the device can be arranged to display a notification asking the user whether they would like to begin watching the recommended VOD content immediately. If the user declines, the recommended content item could be added to a list of preferred items of the corresponding content type, for later viewing.

The direction-sensitive aspect of the user interface of FIG. 7 is not limited to interaction between the contact selection areas 711 and content type selection areas 712. Other combinations of selection areas can also be dragged to one another to trigger different actions. For example, as shown in FIG. 7, an individual content item selection area 718 can be dragged to a content type selection area, in this case "Recorded Shows", to add that content item to a list of programmes to be recorded. When user input is received in the other direction, by dragging the "Recorded Shows" content type selection area to the content item selection area 717 or the individual content item selection area 718 within the content item selection area 717, the current list of recorded programmes can be displayed.

In this way, by dragging individual content items to a content type selection area, a user can update a list of preferred content associated with that content type selection area. A list of preferred content comprises a list of one or more preferred content items. The preferred content items can be content items which have been selected by a user, as in this example. Preferred content items can also be automatically selected, for example based on the current user's viewing history. Additionally, the preferred content list can include recommended content items received from the current user's contacts.

As shown in FIG. 7, a plurality of contact selection areas 711 are displayed in the user interface. When more contacts are available than there is space to display the contacts, the device can rank the contacts in order to select a predetermined number to be displayed. In the present embodiment, the contacts are ranked based on a history of content recommendations received from each of the plurality of contacts, by assigning a higher ranking to contacts with a history of recommending more relevant content. A predetermined number N of the contact selection areas 711 are then displayed, corresponding to the N highest ranked contacts.

In more detail, the contacts can be ranked by assigning a higher ranking to one of the plurality of contacts if content recommended by the contact has been accessed more often by the current user of the device, in comparison to content recommended by another one of the plurality of contacts. Instead of, or as well as, this ranking method, the ranking can be performed by assigning a higher ranking to one of the plurality of contacts if content recommended by the contact has a higher popularity amongst other ones of the plurality of contacts, in comparison to content recommended by another one of the plurality of contacts.

Ranking the contacts in this way allows the device to select those contacts which have a history of recommending more relevant content, that is, content which is preferred by the current user and/or by other contacts within the current user's social networking circle of friends.

As shown in FIG. 7, the user interface also includes an "all friends" selection area 716. This is a type of contact selection area which selects all of the current user's contacts. For example, by dragging the "all friends" selection area 716 to a content type selection area 712, a user can view the recommended content items for all of the contacts. Similarly, by dragging a content type selection area 712 to the "all friends" selection area 716, a user can recommend content items of the selected type to all their contacts in a single step.

Furthermore, as shown in FIG. 7 the user interface further includes a plurality of application selection areas 715 for selecting various applications, for example email or social networking applications. These can be dragged to or from the contact selection areas 711 to perform various actions as described above with reference to FIG. 2.

As described above, the screen shown in FIG. 7 implements a direction-sensitive user interface to allow different actions to be performed. In addition to the direction-sensitive aspect, the user interface can also allow other actions to be performed by selecting any of the selection areas 711, 712, 715, 716, 717 using different input methods.

For example, instead of dragging a contact selection area to a content type selection area, a user can select the contact selection area on its own, for instance by touching or clicking on the contact selection area instead of dragging. In response to a contact selection area being selected on its own a third predetermined action can be performed, for example the device can be arranged to display a list of all recommended content from that contact, for all content types, in the content item selection area 717.

As another example, in response to user input selecting a content type selection area on its own, the device can display a list of user preferred content items in the content item selection area 717. For example, if a user selected the "Recorded Shows" content type in the user interface of FIG. 7, the channel list currently displayed in the content item selection area 717 could be replaced with a list of previously-recorded content and/or content selected for future recording.

Referring now to FIG. 8, a method of displaying recommended content in the user interface of FIG. 7 is illustrated, according to an embodiment of the present invention. In the present embodiment, the method is performed as the first predetermined action, in response to user input selecting one of the contact selection areas before one of the content type selection areas. However, in another embodiment the method of FIG. 8 could be performed as the second predetermined action in response to user input in the other direction, i.e. selecting the content type before the contact.

First, in step S801 the user input selecting a contact before the content type is received, for example the user input 713 shown in FIG. 7. Then, in step S802 it is determined whether a content recommendation for the selected content type has been received from the selected contact. The content recommendation defines one or more recommended content items. For example, the content recommendation can include the actual content items themselves (e.g. entire audio/video/image files, playlists etc), or can include information identifying a location from which the content items can be obtained.

Then, in response to a determination that a content recommendation has been received from the selected contact, in step S803 the user interface displays information identifying the one or more recommended content items, for example in the content item selection area 717.

On the other hand, in response to a determination that a content recommendation for the selected content type has not been received from the selected contact, then in step S804 the device transmits a request for the content recommendation to the selected contact. Alternatively, in other embodiments step S804 can be omitted and the device can take no further action in response to a negative determination in step S802.

When a device receives the request transmitted in step S804, the device can be arranged to prompt a user to select one or more content items of the selected content type as recommended content items, and to transmit the content recommendation defining the recommended content items to the other device.

Referring now to FIG. 9, a method of recommending content to another user through the user interface of FIG. 7 is illustrated, according to an embodiment of the present invention. In the present embodiment, the method is performed as the second predetermined action, in response to user input selecting one of the content type selection areas before one of the contact selection areas. However, in another embodiment the method of FIG. 9 could be performed as the first predetermined action in response to user input in the other direction, i.e. selecting the contact before the content type.

First, in step S901 the user input selecting a content type before the contact is received, for example the user input 714 shown in FIG. 7. Then, in step S902 it is determined whether recommended content items have been defined for the selected content type. If the recommended content items have already been defined, then in step S903 the device transmits a content recommendation defining the selected recommended content items to the selected contact.

On the other hand, if recommended content items have not been defined in step S902, then in step S904 the user interface prompts the user to select one or more content items of the selected content type as recommended content items. Then, the device proceeds to step S903 and transmits the content recommendation to the selected contact.

In some embodiments, steps S902 and S904 can be omitted. For example, the user interface may be arranged to only allow content types to be selected for which a list of recommended content exists, in which case it is not necessary to check whether recommended content items have been defined in step S902. Furthermore, recommended content items can be selected automatically without user input, for example based on the user's viewing habits, in which case step S904 can also be omitted.

In the above-described examples, a user interface such as the one shown in FIG. 7 can be used to receive a content recommendation from another device, and/or to transmit a content recommendation to another device. Depending on the embodiment and the content type selected, the recommended content items may be available from different sources. For example, recommended broadcast programmes may be accessed at specific broadcast times through a broadcast stream, recommended VOD content may be accessed at any time from a VOD server, and recommended user-recorded content may be accessed at any time from a user storage unit, which could for example be cloud-based storage. In embodiments where one or more recommended content items are stored in a network storage unit such as cloud-based storage, the content recommendation can include a security token for accessing the recommended content items from the network storage unit. This feature allows recommended content items to be securely shared between users across a network.

As described above, depending on the order in which the user input selects the first and second selection areas, a different predetermined action is performed. Embodiments of the present invention therefore allow a user to select different actions to be performed by selecting the areas in a different order. The different predetermined actions are performed for an object selected by the first selection area. Therefore by providing user input selecting the selection areas in a different order, a user of the device 100 can cause a different action to be taken. In contrast, in a conventional user interface extra input is required to select more than one action, causing inconvenience for a user. For instance, in a conventional user interface, in order to create a message to a contact a user must separately select a messaging application, select an action to be performed, namely composing a new message, and select a contact to which the message is to be sent. In an embodiment of the present invention, the user only has to select the messaging application and the contact. The order in which the selection is performed is used to identify the action that should be performed, such as composing a new message to the contact or displaying information about messages received from the contact.

Also, as described above, the predetermined action that is performed can be determined according to the order in which the selection areas 111, 112 are selected, and also according to what is selected by each selection area. In the present embodiment, the first selection area 111 is an area for selecting an object on which the different predetermined actions can be performed. The first selection area 111 can therefore be referred to as an object selection area. Examples of objects that can be selected include contacts, multimedia files, data files, documents, other devices, or applications. The second selection area 112 can be an area for selecting an action, for example can be an area for selecting an application such as an email client or social networking application. In such embodiments the second selection area 112 can be referred to as an action selection area. Alternatively, the second selection area can select an object such as a contact, multimedia file, data file, document, or other device, and the action to be performed can be selected based on the type of object selected by the second selection area 112.

Embodiments of the present invention have been described in which a device includes a touch screen display, and the user input selecting first and second selection areas comprises a drag event. However, the present invention is not limited to this arrangement, and in other embodiments various types of interface and various input methods can be used. Examples of different input methods for a touch-screen interface include but are not limited to a single-tap, double-tap, touch-and-hold and touch-and-drag input methods. Examples of different input methods for a pointer-based interface such as a mouse, trackball or touchpad interface, include but are not limited to, single-click, double-click, click-and-hold, and click-and-drag input methods. In other embodiments of the present invention, touchless interaction methods such as motion recognition, eye-tracking, sonar, and/or voice recognition may be used. For example, motion recognition can be used to recognise a physical gesture from a captured image or sequence of images, and interpret the physical gesture as user input selecting the selection areas in order, eye-tracking could be used to allow a user to select one of the selection areas by looking at the selection area, and voice recognition could be used to receive user input selecting the selection areas in order through verbal instructions.

In some embodiments, feedback can be provided to the user during use of the user interface. For instance, when the user input comprises a drag event, feedback may be provided by displaying a path along which the user has dragged so far, during the drag event, or by animating one or both of the selection areas during the drag event to show the selection area, for instance as an icon or tile, being dragged towards the other selection area. In some embodiments each selection area could be highlighted when selected by the user, or otherwise altered in appearance, to indicate to the user that the selection area has been selected. As an example, after selecting the first selection area and before selecting a second selection area, the appearance of the first and second selections area could be changed to be displayed as complementary shapes that can interlock when dragged to one another. This provides a visual clue that indicates to a user that an action can be performed by dragging the selected first selection area to one of the second selection areas.

Furthermore, embodiments of the present invention have been described in which first and second predetermined actions are performed depending on the order in which first and second selection areas are selected. Also, as described above, various input methods are possible. In some embodiments, the user input selecting the first and second selection areas can be received based on a first input method, for example a drag gesture on a touch screen. Different actions can then be selected and performed by selecting either the first or second selection area on its own, using a second input method, for example single-tap on a touch screen. The second input method can be a default method used for interaction in the user interface, for example a single-click or double-click to open a contact, file, application or folder. Using different input methods in this way allows a user to perform a default action by using a default input method, for example launching an application by tapping an icon for the application. In the same user interface, the user can initiate a different action by using a different input method, for example dragging between the application icon and a contact icon. The different input method initiates the direction-sensitive control method described above, in which different other predetermined actions are performed according to the order in which the areas are selected.

Although embodiments of the present invention have been described in relation to portable electronic devices, and in particular smartphones, the device can be any device that includes a display and is capable of receiving user input to select areas, for example icons or tiles, displayed on the display. The device can be a portable electronic device such as a mobile telephone, smartphone, personal digital assistant (PDA), electronic book (also referred to as an e-book or e-reader), laptop computer or tablet computer, or can be any other device such as a desktop computer, television, or any other home appliance including a display such as a connected fridge or microwave oven.

Whilst certain embodiments of the present invention have been described above, the skilled person will appreciate that many variations and modifications are possible without departing from the scope of the invention as defined in the claims.

The invention claimed is:

1. A method for providing a user interface in a device, the method comprising:
    displaying a first selection area and a second selection area on a display;
    receiving a user input selecting the first selection area and the second selection area, the first selection area being an area for selecting an object and the second selection area being an area for selecting an application corresponding to the object;
    performing a first predetermined action for the selected object and the selected application in response to the user input selecting the first selection area before the second selection area; and
    performing a second predetermined action, which is different than the first predetermined action, for the selected object and the selected application in response to the user input selecting the second selection area before the first selection area.

2. The method of claim 1, wherein the user input selects the first selection area and the second selection area according to a first input method, and the method further comprises:
    performing a third predetermined action in response to the user input selecting the first selection area according to a second input method different to the first input method; and
    performing a fourth predetermined action in response to the user input selecting the second selection area according to the second input method,
    wherein each of the first input method and the second input method is at least one from among a drag gesture, a touchless body motion gesture, a speech input, and an eye gesture.

3. The method of claim 1, further comprising:
displaying a third selection area together with the first selection area and the second selection area; and
performing a fifth predetermined action for the selected object in response to the user input selecting the third selection area in addition to the first selection area and the second selection area.

4. The method of claim 3, wherein the third selection area is an area for selecting an optional parameter relating to the first predetermined action or the second predetermined action, and performing the fifth predetermined action comprises:
performing the first predetermined action modified by the optional parameter, in response to the user input selecting the first selection area before the second selection area and selecting the third selection area; and
performing the second predetermined action modified by the optional parameter, in response to the user input selecting the second selection area before the first selection area and selecting the third selection area.

5. The method of claim 3, wherein the display is a touch screen, and the user input selects the first selection area, the second selection area, and the third selection area by:
touching the first selection area, the second selection area, and the third selection area; or
dragging the first selection area and the third selection area to the second selection area; or
dragging the first selection area to the second selection area via the third selection area; or
dragging the first selection area to the second selection area while touching the third selection area.

6. The method of claim 1, wherein the display is a touch screen, and
wherein the user input selecting the first selection area before the second selection area comprises a drag gesture from the first selection area to the second selection area, and the user input selecting the second selection area before the first selection area comprises a drag gesture from the second selection area to the first selection area.

7. The method of claim 1, further comprising:
displaying a plurality of first selection areas, including the first selection area, as surfaces on a rotatable two-dimensional representation of a first three-dimensional object; or
displaying a plurality of second selection areas, including the second selection area, as surfaces on a rotatable two-dimensional representation of a second three-dimensional object.

8. The method of claim 1, wherein the first selection area is an area for selecting a contact as the selected object, and the method further comprises:
obtaining usage information for each one of a plurality of contacts including said contact, the usage information including information about a frequency of use for each of the plurality of contacts;
ordering the plurality of contacts based on the frequency of use of each one of the contacts; and
displaying a predetermined number N of first selection areas for selecting N most frequently used contacts.

9. The method of claim 8, wherein the second selection area is an area for selecting a call function, and
wherein one of the first predetermined action and the second predetermined action comprises initiating a telephone call to the selected contact and the other one of the first predetermined action and the second predetermined action comprises displaying information about calls made to or received from the contact.

10. The method of claim 8, wherein the second selection area is an area for selecting an email client, and
wherein one of the first predetermined action and the second predetermined action comprises displaying an email composition area for composing a new email to the selected contact, and the other one of the first predetermined action and the second predetermined action comprises displaying information about emails received from the selected contact.

11. A device comprising:
a display configured to display a first selection area and a second selection area on the display; and
a processor configured to:
receive a user input selecting the first selection area and the second selection area, the first selection area being an area for selecting an object and the second selection area being an area for selecting an application corresponding to the object;
perform a first predetermined action for the selected object and the selected application in response to the user input selecting the first selection area before the second selection area; and
perform a second predetermined action, which is different than the first predetermined action, for the selected object and the selected application in response to the user input selecting the second selection area before the first selection area.

12. The device of claim 11, wherein the processor is further configured to receive the user input selecting the first selection area and the second selection area according to a first input method, and is further configured to perform a third predetermined action in response to user input selecting the first selection area according to a second input method different to the first input method, and to perform a fourth predetermined action in response to user input selecting the second selection area according to the second input method,
wherein each of the first input method and the second input method is at least one from among a drag gesture, a touchless body motion gesture, a speech input, and an eye gesture.

13. The device of claim 11, wherein the processor is further configured to control the display to display a third selection area together with the first selection area and the second selection area on the display, and
wherein the processor is further configured to perform a fifth predetermined action for the selected object in response to the user input selecting the third selection area in addition to the first selection area and the second selection area.

14. The device of claim 11, wherein the display is a touch screen and the processor is further configured to receive the user input through the touch screen, and
wherein the user input selecting the first selection area before the second selection area comprises a drag gesture from the first selection area to the second selection area, and the user input selecting the second selection area before the first selection area comprises a drag gesture from the second selection area to the first selection area.

15. The device of claim 11 wherein the processor is further configured to control the display to display a plurality of first selection areas, including the first selection area, as surfaces on a rotatable two-dimensional representation of a first three-dimensional object, or to display a plurality of second selection areas, including the second selection area, as surfaces on a rotatable two-dimensional representation of a second three-dimensional object.

16. The device of claim 11, wherein the first selection area is an area for selecting a multimedia file, a data file, a document, or another device.

17. The device of claim 11, wherein the first selection area is an area for selecting a contact as the selected object, and
wherein the processor is further configured to obtain usage information for each one of a plurality of contacts including said contact, the usage information including information about a frequency of use for each of the plurality of contacts, order the plurality of contacts based on the frequency of use of each one of the contacts, and control the display to display a predetermined number N of first selection areas for selecting N most frequently used contacts.

18. The device of claim 17, wherein the second selection area is an area for selecting a call function, and
wherein one of the first predetermined action and the second predetermined action comprises initiating a telephone call to the selected contact and the other one of the first predetermined action and the second predetermined action comprises displaying information about calls made to or received from the contact.

19. The device of claim 18, wherein the second selection area is an area for selecting an email client, and wherein one of the first predetermined action and the second predetermined action comprises displaying an email composition area for composing a new email to the selected contact, and the other one of the first predetermined action and the second predetermined action comprises displaying information about emails received from the selected contact.

20. A non-transitory computer readable recording medium having embodied thereon a program for executing the method of claim 1.

* * * * *